(No Model.) 2 Sheets—Sheet 1.

G. W. CUNNINGHAM & J. M. FERRY.
REPLANTING ATTACHMENT FOR CULTIVATORS.

No. 448,131. Patented Mar. 10, 1891.

WITNESSES:

INVENTOR:
G. W. Cunningham
BY J. M. Ferry
Munn & Co.
ATTORNEYS.

(No Model.) 2 Sheets—Sheet 2.

G. W. CUNNINGHAM & J. M. FERRY.
REPLANTING ATTACHMENT FOR CULTIVATORS.

No. 448,131. Patented Mar. 10, 1891.

WITNESSES:
John W. Deemer
C. Sedgwick

INVENTOR:
G. W. Cunningham
J. M. Ferry
BY Munn & Co.
ATTORNEYS.

UNITED STATES PATENT OFFICE.

GEORGE WASHINGTON CUNNINGHAM AND JAMES MERADTH FERRY, OF BISMARCK, ILLINOIS.

REPLANTING ATTACHMENT FOR CULTIVATORS.

SPECIFICATION forming part of Letters Patent No. 448,131, dated March 10, 1891.

Application filed July 23, 1889. Serial No. 318,416. (No model.)

*To all whom it may concern:*

Be it known that we, GEORGE WASHINGTON CUNNINGHAM and JAMES MERADTH FERRY, of Bismarck, in the county of Vermilion and State of Illinois, have invented a new and useful Improvement in Replanting Attachments for Cultivators, of which the following is a full, clear, and exact description.

Our invention relates to a replanting attachment for cultivators, and has for its object to provide a device of simple and economical construction capable of being applied to any corn-cultivator, and which may be operated at the will of the driver to drop seed into hills where the corn is missing when the standing corn is being plowed over for the first time, and wherein also the seed dropped will be covered by the cultivator-shovels as they advance.

The invention consists in the novel construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1:
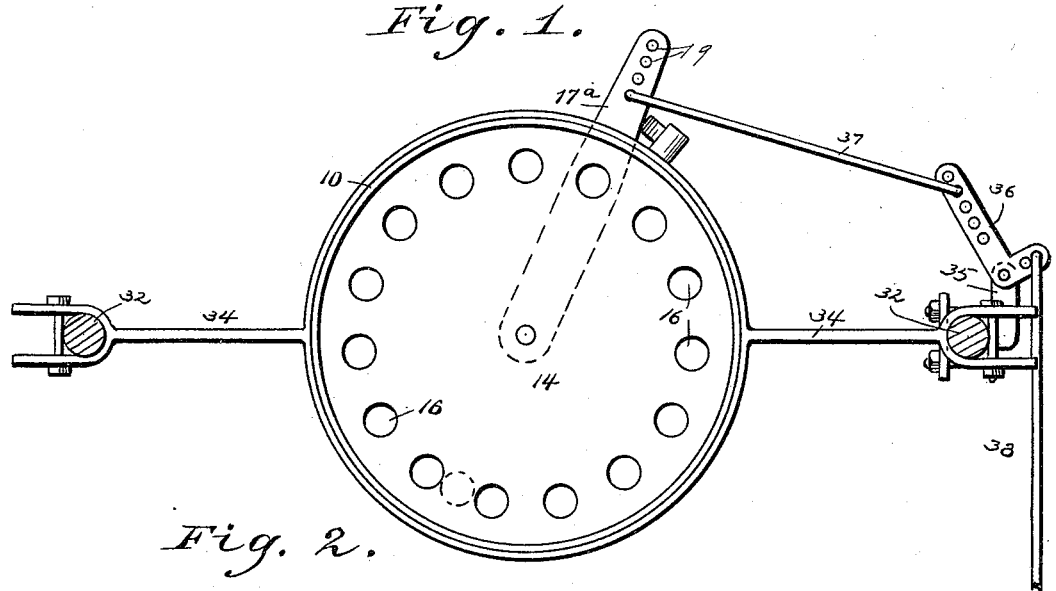
Figure 2:
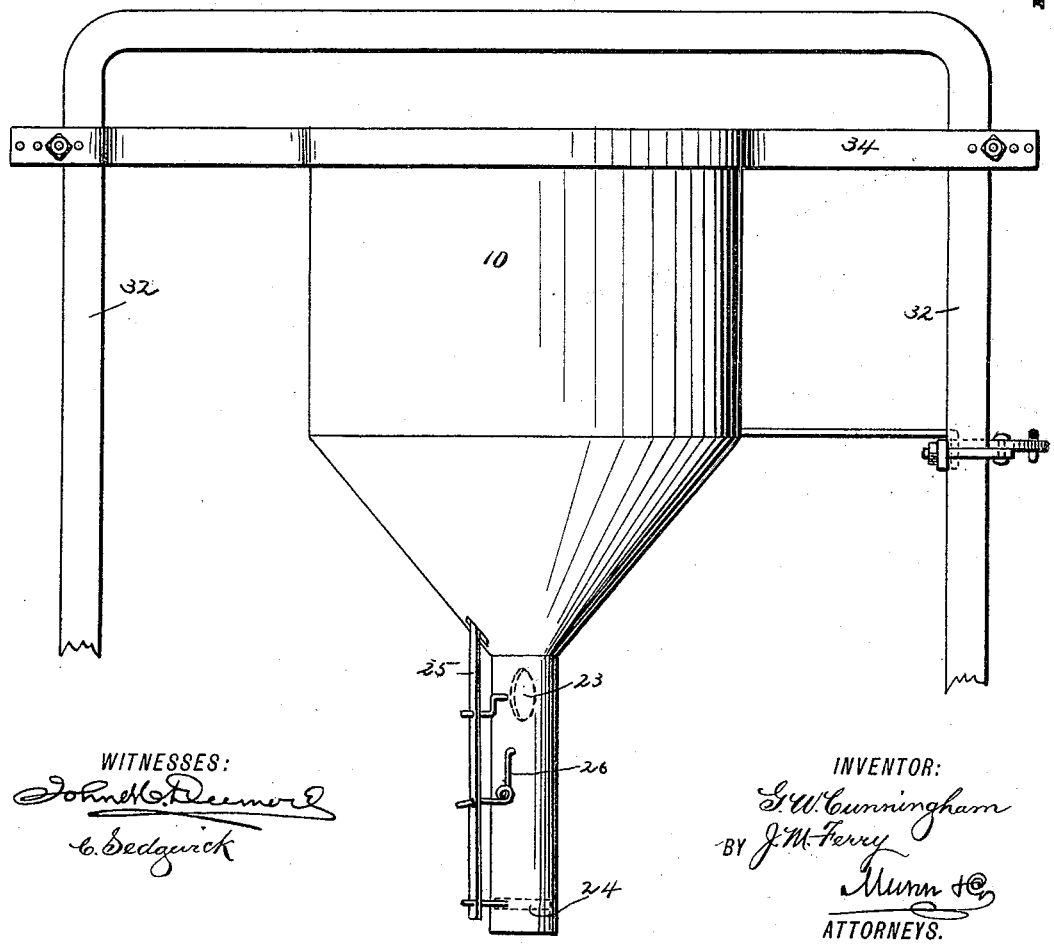
Figure 3:
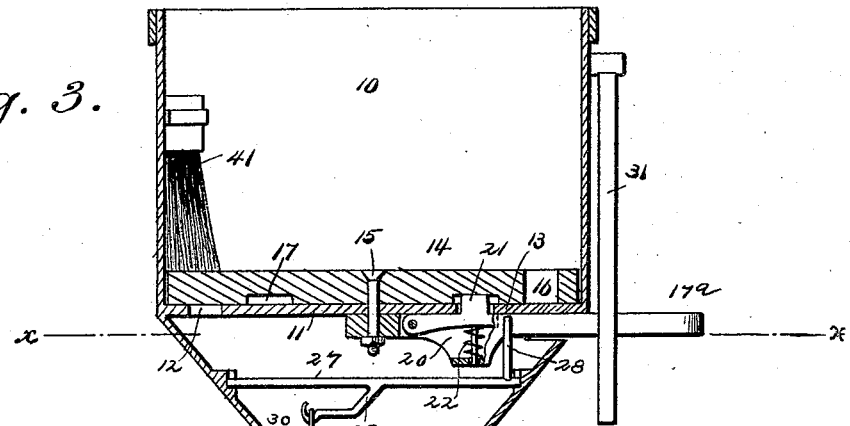
Figure 6:
Figure 4:
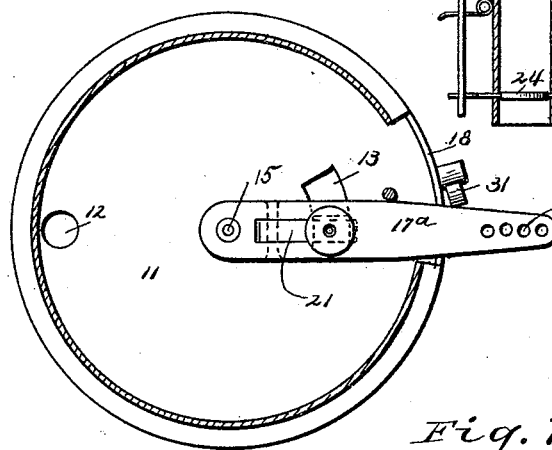
Figure 5:
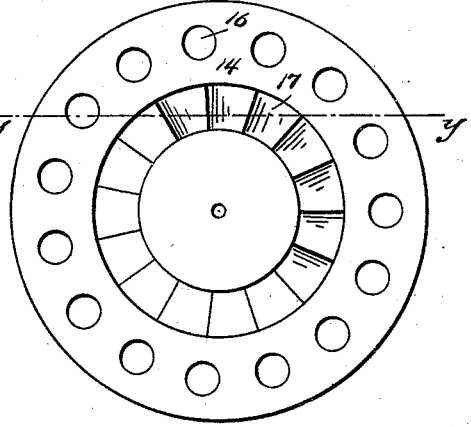
Figure 7:
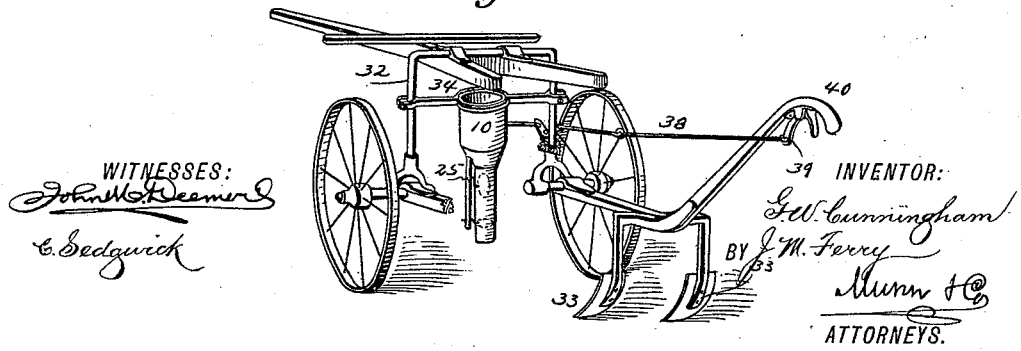

Figure 1 is a plan view of the attachment. Fig. 2 is a side elevation of the same. Fig. 3 is a central vertical section. Fig. 4 is a transverse section on line $x$ $x$ of Fig. 3. Fig. 5 is a bottom plan view of the seed-carrying disk. Fig. 6 is a diametrical section through Fig. 5 on line $y$ $y$; and Fig. 7 is a perspective view of the cultivator, illustrating the application thereto of the device.

In carrying out the invention, the body of the device consists of a hopper 10, constructed substantially in the shape of a funnel, which hopper in the enlarged section is provided with a transverse diaphragm or partition 11, having produced therein near the periphery a seed-opening 12 and in diametrical alignment with the said opening a radial slot 13.

Upon the partition or diaphragm 11 a seed-carrying disk 14 is held to revolve, being secured to the said diaphragm or partition by a central pivotal bolt 15. This seed-carrying disk has produced therein a series of marginal seed-openings 16, arranged at stated intervals apart, as best shown in Figs. 1 and 5, and in the bottom of the disk a series of countersunk ratchet-teeth 17 is arranged in a circle around the center, adapted for a purpose hereinafter stated. The seed-openings 16 of the seed-carrying disk are so placed that when the disk revolves upon the partition or diaphragm 11 the openings will consecutively register with the seed-opening 12 in the said partition or diaphragm. The seed-carrying disk is rotated through the medium of a lever 17$^a$, having one end pivoted upon a pivotal bolt 15, heretofore referred to, the opposite end of which lever projects outward through a diametrical slot 18 in the side of the hopper, and the said outer projecting end is provided with a series of apertures 19, as best shown in Figs. 1 and 4. A recess 20 is formed in the lever between its ends, in which recess one end of a dog 21 is pivoted, which dog is normally kept in contact with the ratchet-teeth 17 of the seed-carrying disk by means of a spring 22, bearing upon the base wall of the lever-recess and the contiguous face of the dog, as best illustrated in Fig. 3.

In the shank or lower section of the hopper a cut-off valve or damper 23 is journaled at or near the upper end, and at or near the lower end of said section a similar drop-valve or damper 24 is journaled, both of the said dampers being attached at one outer end to a pitman or connecting-rod 25. The dampers or valves are so attached to the said rod that when the upper valve or damper is open the lower valve or damper will be closed, as shown in Fig. 3, this being the normal position of the dampers. The dampers are held normally in this position through the medium of a spring 26, attached to one outer face of the lower hopper-section and at the other end to the connecting-rod.

Between the lower section of the hopper and the partition 11 in the upper enlarged section a rock-shaft 27 is horizontally journaled, as illustrated in Fig. 3, which rock-shaft, near one extremity, is provided with an upwardly-extending arm 28, adapted for contact with one side of the lever 17$^a$, and from a point at or near the center of the rock-shaft a second angled arm 29 is downwardly projected at an angle to the arm 28, and to the outer extremity of this angled arm 29 of the rock-shaft the upper end of the pitman or connecting-rod 25 is connected by means of a link or equivalent device. The normal position of the rock-shaft is such that the arm 28 occupies a perpendicular position in contact with one side of the lever 17ª, and when the rock-shaft is in its normal position the dampers or valves are likewise. The lever 17ª, operating the seed-carrying disk, is held in contact with the arm 28 and one side of the slot 18 in the hopper by means of a spring-arm 31.

In operation the device is adapted to be located centrally of the arch 32 of the cultivator, as shown in Fig. 7, and in horizontal alignment with the central space between the cultivator teeth or blades 33, and the device is secured to the vertical members of the arch 32 by means of a yoke 34, which clamps the upper portion of the hopper, the arms of the yoke being rigidly secured to the said vertical members of the arch.

Upon a stud or bracket 35, projected from one of the vertical members of the arch 32, a bell-crank lever 36 is fulcrumed, which bell-crank lever is connected with the outer end of the lever 17ª by a link 37, and the said bell-crank lever is further connected by a link or links 38 with a spring-actuated trigger 39 of any approved construction, held to rock upon the under face of the handle 40 of the implement, as is likewise best illustrated in Fig. 7.

In operation, the parts being in their normal position when the trigger is pressed downward by the operator, the lever 17ª is moved laterally in the slot 18, which causes the seed-carrying disk to revolve one tooth, bringing one of the openings 16, containing the seed, in registry with the opening 12 in the partition 11, whereby the seed is enabled to fall downward upon the upper damper, which is closed by the lever 17ª in its lateral movement, contacting with the arm 28 and rocking the shaft 27, which movement also, as heretofore stated, opens the lower drop-valve or damper. Thus if a seed has been previously deposited upon the lower drop-valve or damper the same is permitted to fall to the ground, while the seed to be next dropped is deposited upon the upper cut-off valve or damper. Upon releasing the trigger 39 the lever 17ª is forced back by the spring-arm 31 to its normal position, whereby the dog is brought in contact with another tooth to again revolve the disk, and the dampers or valves assume their normal position, whereby the seed upon the upper valve or damper falls to the lower valve, which is closed.

In order that the surplus seed may be removed from the openings of the seed-carrying disk which register with the seed-opening in the partition or diaphragm 11, a brush 41 is rigidly secured to the side of the hopper above the disk, the bristles of said brush being made to contact with the said disk immediately over the seed-opening in the partition, as shown in Fig. 3. Thus only the amount of seed capable of being contained in the opening is dropped.

Having thus described our invention, we claim as new and desire to secure by Letters Patent—

1. In a replanting attachment, the combination, with an essentially funnel-shaped hopper provided with a horizontal partition having a single seed-opening produced therein and a curved slot 13, of a disk held to revolve upon the partition, provided with a series of seed-openings capable of registering with the seed-opening in the partition, ratchet-teeth upon the under face, and a lever fulcrumed at one end beneath the partition, provided with a vertically-movable dog capable of contacting with the ratchet-teeth through said slot, substantially as and for the purpose specified.

2. In a replanting attachment, the combination, with an essentially funnel-shaped seed-hopper provided with a horizontal partition having a single seed-opening produced therein and a disk held to revolve upon the said partition, provided with a series of seed-openings, each capable of registering with the seed-opening in the partition and provided with ratchet-teeth upon the under face, of a lever fulcrumed beneath the partition, a spring-actuated dog pivoted in said lever, capable of contact with the ratchet-teeth of the disk, valves located in the reduced portion of the hopper, a rock-shaft having an arm projecting into the path of said lever, and a connection between the said rock-shaft and valves, substantially as shown and described.

3. In a replanting attachment, the combination, with a hopper, a partition horizontally supported in said hopper, provided with a single seed-opening and a radial slot, a seed-carrying disk held to revolve upon the partition, provided with a series of seed-openings capable of consecutively registering with the seed-opening of the partition, and ratchet-teeth produced in the under face of the disk, a lever pivoted at one end to the under face of the partition, and a spring-actuated dog pivoted in the said lever, capable of contact with the ratchet-teeth of the disk, of a rock-shaft provided with an arm contacting with the lever and a downwardly-extending angled arm, a cut-off valve or damper and a drop-valve or damper pivoted in the reduced section of the hopper, and a spring-actuated connecting-bar uniting the said dampers or valves with the angled arm of the rock-shaft, the dampers being so attached to the said connecting-bar that when one is closed the other is open, substantially as and for the purpose specified.

4. A combined replanter and cultivator consisting in the arched wheeled frame, the hopper 10, supported thereby and provided with a single seed-opening in its bottom, a seed-spout below the opening and terminating at a height above the ground out of reach of the growing plants, a rotary disk having a circular series of openings registering successively with the opening in the hopper-bottom and a concentric series of ratchet-teeth on its under face, a horizontal lever provided with a vertically-movable dog engaging said ratchet-teeth, valves in the seed-spout operated from said lever, a cultivator hinged to the arched frame in rear of and to one side of the seed-hopper to work between the rows while the spout is passing over the row of plants, and a trigger or hand-lever on the cultivator-handle and connected to the lever of the seed-dropper for operating the same to deliver seed to vacant places in the rows of plants, substantially as set forth.

GEORGE WASHINGTON CUNNINGHAM.
JAMES MERADTH FERRY.

Witnesses:
W. H. DAYTON,
SHERMAN WILSON.